United States Patent
Ophey (10) Patent No.: US 6,473,386 B1
(45) Date of Patent: Oct. 29, 2002

(54) OPTICAL SCANNING DEVICE FOR TWO TYPES OF RECORD CARRIERS

(75) Inventor: Willem G. Ophey, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/474,301

(22) Filed: Dec. 29, 1999

(30) Foreign Application Priority Data

Dec. 29, 1998 (EP) .............................................. 98204459

(51) Int. Cl.⁷ ................................................. G11B 7/00
(52) U.S. Cl. .................. 369/112.23; 369/94; 369/44.23
(58) Field of Search ............... 369/44.23, 94, 369/112.23, 112.24, 112.25, 112.26

(56) References Cited

U.S. PATENT DOCUMENTS 5,446,565 A * 8/1995 Komma et al. .......... 369/44.23
5,708,638 A   1/1998 Braat et al. .................. 369/112
5,870,369 A * 2/1999 Chung et al. .................. 369/94

OTHER PUBLICATIONS

"Optics of Reflective Videodisc Players", SMPTE Journal, vol. 85, Nov. 1976, pp. 881–886.

* cited by examiner

Primary Examiner—Thang V. Tran
(74) Attorney, Agent, or Firm—Michael E. Belk (57) ABSTRACT

In an optical scanning device suited for scanning two types of record carriers having a different thickness of their transparent layers and wherein an astigmatic element is used in combination with a quadrant detector for generating a focus error signal ($S_f$), this signal, which is generated when one type of record carrier is scanned, can considerably be improved by arranging an aspheric surface profile in only the central part of the beam coming from said one type of record carrier.

6 Claims, 11 Drawing Sheets

OPTICAL SCANNING DEVICE FOR TWO TYPES OF RECORD CARRIERS

BACKGROUND OF THE INVENTION

1. Technical Field

The invention relates to an optical scanning device for scanning a first type of record carrier provided with a first information layer and a first transparent layer having a first thickness, and for scanning a second type of record carrier provided with a second information layer and a second transparent layer having a second thickness which differs from the first thickness.

2. Related Art

Generally, the transparent layer in optical record carriers is intended for protecting the information layer from ambient influences and for providing mechanical support to the information layer, in other words, the transparent layer functions as a substrate for the information layer. The thickness of the transparent layer is a compromise between the thickness which is desired to give the record carrier the desired rigidity and the thickness which is desired in connection with the numerical aperture (NA) of the scanning beam incident on the transparent layer. The NA of the objective system on the side of the record carrier is determined by the resolution which the scanning device must have, i.e. by the information density of the information layer. Generally, a higher NA is necessary for a larger information density. For envisaged novel record carriers with a larger information density thus requiring a higher NA, it is often necessary to reduce the thickness of the information layer so as to decrease the influence of tilt of the record carrier on the quality of the focus, or scanning spot. In fact, this influence will be greater at a higher NA. With the advent of novel record carriers having larger information densities, different types of record carriers having different thicknesses of the transparent layer will be on the market. A compatible scanning device will have to be able to scan the different types of record carriers, independently of the thickness of the transparent layer. Scanning a record carrier is herein understood to mean the movement of a scanning spot formed by the scanning beam and the information layer relative to each other for the purpose of reading, writing and/or erasing information.

The transparent layer, through which the scanning beam passes, introduces spherical aberration in the scanning beam. In the design of the objective system, the transparent layer can be taken into account so that this system can compensate said spherical aberration. However, since a given objective system can compensate only for a given thickness of the transparent layer, the quality of the scanning spot will deteriorate due to the under or overcompensated spherical aberration when using this objective system for scanning a record carrier having a different thickness, as is envisaged for a compatible scanning device.

U.S. Pat. No. 5,708,638 (PHN 15.724) discloses a compatible scanning device designed for scanning a first type of record carrier having a larger information density, for example, a record carrier known as DVD. To preclude the detrimental influence of spherical aberration when scanning a second type of record carrier having a smaller density, for example, a record carrier known as CD, it has been ensured that the detector receives only radiation coming from the central part of the pupil, i.e. the central part of the scanning beam coming from this record carrier. When scanning the first type of record carrier, the detector receives radiation of the entire scanning beam coming from this record carrier. These conditions can be fulfilled by adapting, for example, the size of the radiation-sensitive surface of the detector in such a way that, when scanning the first type of record carrier, this size is equal to the cross-section of the scanning beam at the location of the detector, whereas the radiation-sensitive surface comprises only the central part of the beam cross-section of the scanning beam coming from the second record carrier when scanning the second type of record carrier. Use is made of the fact that the spherical aberration, which occurs when scanning the second type of record carrier, mainly occurs in the peripheral part of the scanning beam. By detecting only radiation coming from the central part of the pupil diameter, which central part is, for example, 55% of the pupil diameter, and not detecting the peripheral part of this beam, it is achieved that the beam is reasonably free from spherical aberration for this detector, while this beam still has a sufficient intensity to supply satisfactory signals.

The detector does not only supply an information signal, which represents the information read from the record carrier, but also a focus error signal. The latter signal, which is representative of an axial deviation between the focal plane of the objective system and the plane of the information layer, is used to correct the axial position of the focus, for example, by displacing the objective system in the axial direction. A focus error signal may be obtained, for example, by providing an astigmatizing element, for example, a cylindrical lens in the path of only the reflected scanning beam between the objective system and the detector, which element converts the beam into an astigmatic beam. Such a beam has the property that the shape of the radiation spot formed in the plane of the detector changes upon an axial displacement of the focus of the scanning spot with respect to the information layer. This change of shape can be observed with a detector consisting of four separate detector elements. By combining the output signals of these detector elements in a given way, a focus error signal, referred to as the astigmatic focus error signal, can be obtained. However, it has been found that the desired focus error signal is not obtained when using the astigmatic focus detection method in a compatible scanning device with the above-mentioned small detector surface for scanning the second type of disc. Instead of a smooth S curve having a steep slope around zero, the graph of the focus error signal has a jagged variation and a faint slope around zero, so that the focus error signal obtained is not very well usable in practice.

SUMMARY OF THE INVENTION

It is an object of the invention to provide an optical scanning device of the type described in the opening paragraph, in which a suitable focus error signal is obtained when scanning the second type of record carrier without this being at the expense of the signals obtained when scanning the first type of record carrier. To this end, the scanning device according to the invention is characterized in that an aspherical surface having a size which is substantially equal to the cross-section of said central part is present in the path of only the modulated scanning beam between the objective system and the detector.

The invention is based on the recognition that, when scanning the second type of record carrier, radiation of the scanning beam outside the central part of the pupil diameter is still partly incident on the quadrant detector. Since this beam portion exhibits spherical aberration, this detector detects a beam which is not only astigmatic but also exhibits spherical aberration. Consequently, the radiation spot formed on the detector no longer has a well-detectable change of shape when focus errors occur. By providing an extra aspherical profile in the detection branch of the scanning device, i.e. in the path of only the beam coming from the record carrier and only in the central part of the pupil diameter, this spherical aberration is compensated. Consequently, the beam received by the radiation-sensitive surface of the detector is sufficiently free from aberration to derive a satisfactory focus error signal, also when scanning the second type of record carrier.

An embodiment of the scanning device, in which an astigmatic element is arranged in the path of only the modulated scanning beam, is further characterized in that the aspherical surface is constituted by a surface of the astigmatic element.

For correcting the spherical aberration, it is then not necessary to place an extra element in the detector branch, so that material costs and assembly time can be saved. The astigmatic element, which may be a separate cylindrical lens but may be alternatively constituted by another component of the scanning device, is necessary to render the modulated scanning beam astigmatic, so that a focus error signal can be derived from this beam.

A preferred embodiment of the scanning device, in which the astigmatic element is constituted by a cylindrical lens and in which the cylindrical lens is integrated with a rotationally symmetric lens, is characterized in that the aspherical surface is constituted by a surface of the rotationally symmetric lens.

These and other aspects of the invention are apparent from and will be elucidated with reference to the embodiments described hereinafter.

DETAILED DESCRIPTION OF THE INVENTION

Figure 1:
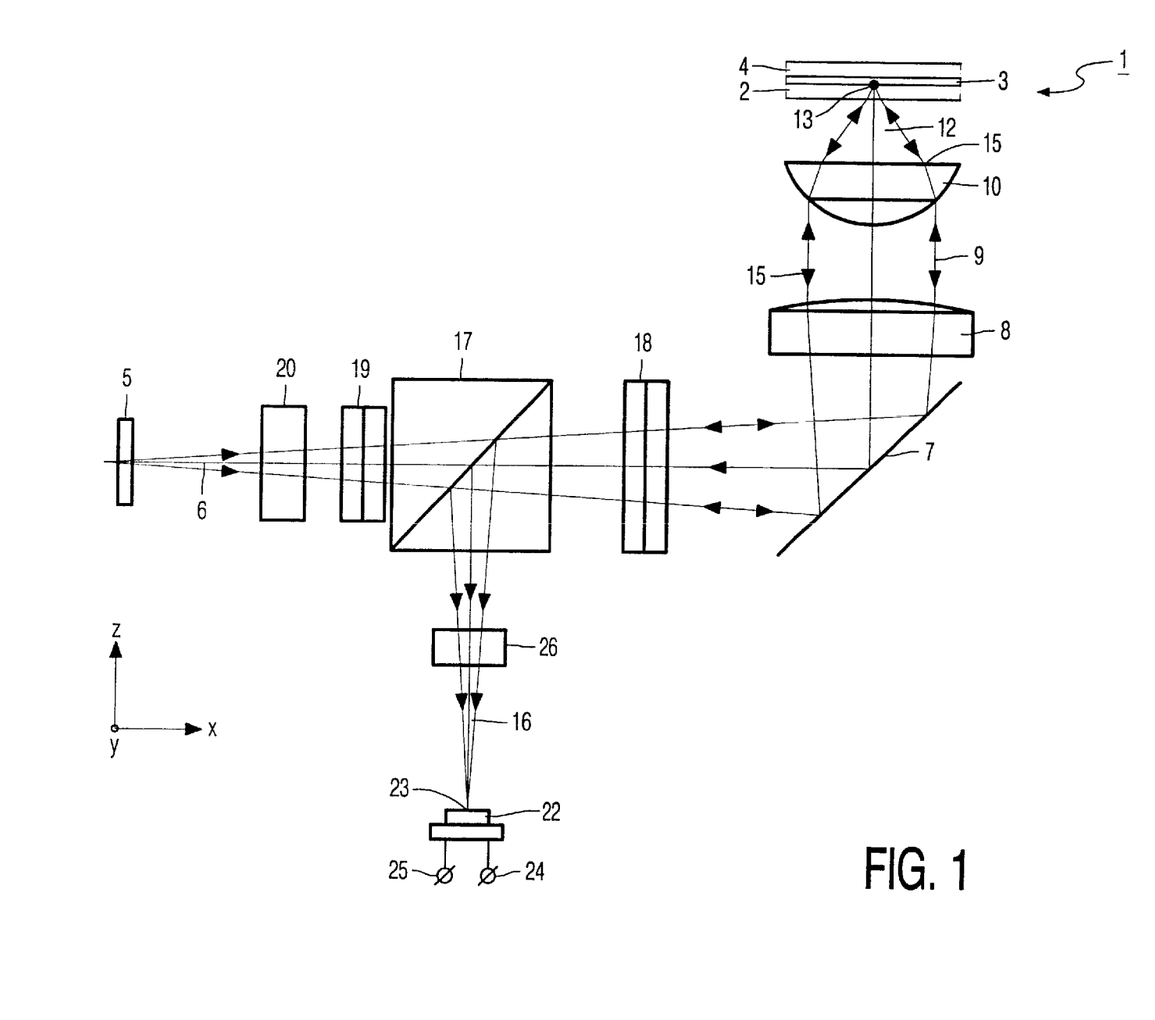
FIG. 1 shows an embodiment of a known scanning device with the scanning beam radiation paths during scanning of a first type of record carrier.
Figure 2:
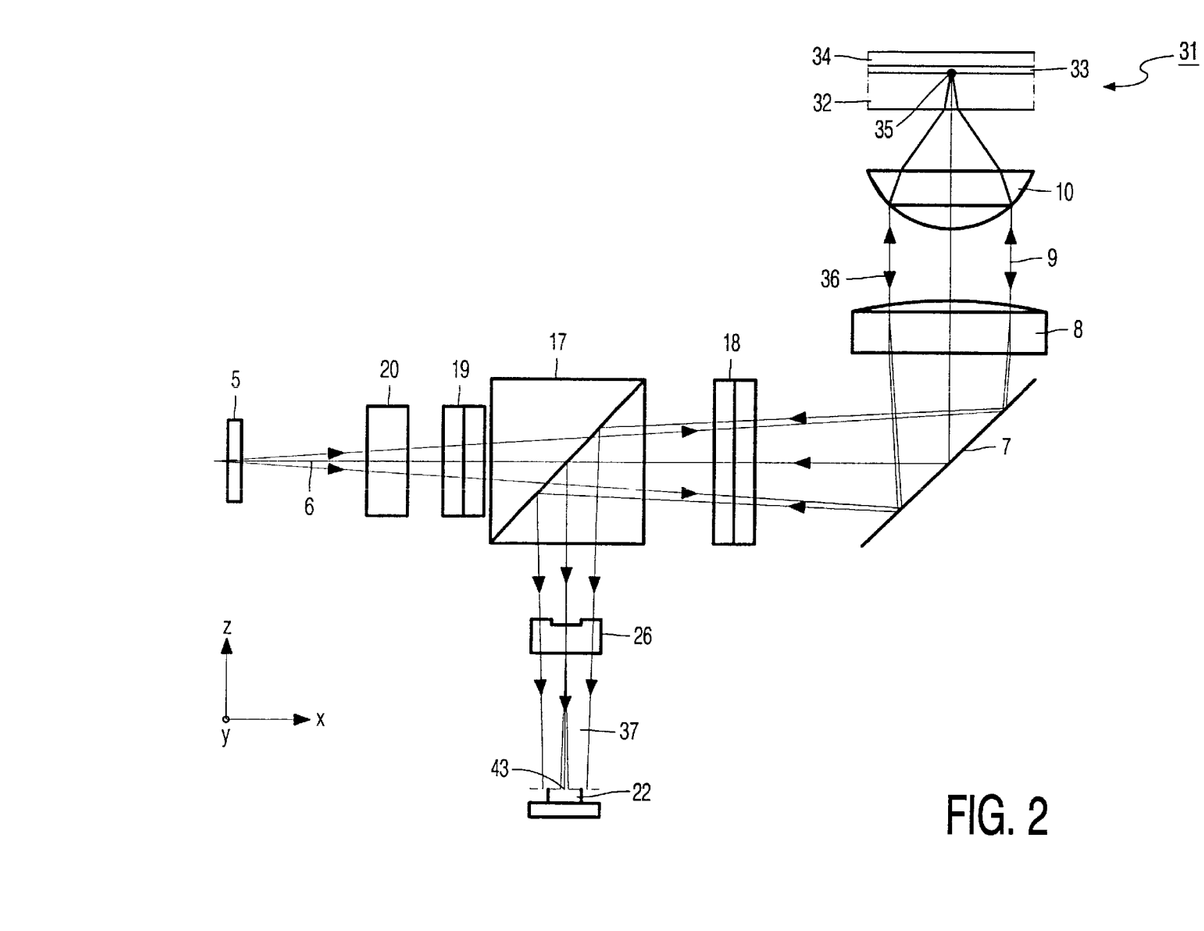
FIG. 2 shows the same scanning device, but with the scanning beam radiation paths during scanning of a second type of record carrier.

FIG. 1 shows a compatible scanning device for scanning a first type of record carrier 1 and a second type of record carrier 31 (FIG. 2). The record carrier 1, only a small part of which is shown in a radial cross-section, has a transparent layer 2, one side of which is provided with an information layer 3. The side of the information layer remote from the transparent layer is protected from ambient influences by a protective coating 4. The transparent layer functions as a substrate of the record carrier because it mechanically supports the information layer. Alternatively, the transparent layer may only have a protective function, while the mechanical support is given by a layer on the other side of the information layer, for example, by the protective coating 4 or by a combination of a further transparent layer and an information layer provided on the information layer 3. Information in the form of optically detectable areas arranged in substantially parallel, concentric or spiral tracks in the information layer may be stored on the record carrier, which tracks are not shown in FIG. 1 but are perpendicular to the plane of the drawing in the cross-section shown in this Figure. The information areas may have any optically readable form and may be, for example, pits or areas having a different reflection coefficient or a different direction of magnetization than their surroundings, or they may be a combination of these forms. The record carrier 1 is, for example, of the type known as DVD and has a large information density, and its transparent layer 2 has a relatively small thickness, for example 0.6 mm.

The scanning device comprises a radiation source 5, for example, a diode laser emitting a diverging radiation beam, or scanning beam, 6. This beam is reflected to a collimator lens 8 by a mirror 7. This lens converts the beam into a parallel beam 9 which is incident on an objective lens 10. This lens converts the beam into a converging beam 12 forming a focus, or scanning spot, 13 on the information layer 3. The collimator lens and the objective lens may be replaced by a single lens which converts the diverging beam 6 into the converging beam 12. The single lens may also be replaced by a hologram operating in transmission or in reflection, or by a separating grating provided on a waveguide in which the scanning beam propagates. Radiation from the converging beam 12 which is reflected and modulated by the information layer and forms a reflected and modulated beam 15 returns along the path of the converging beam 12. To separate the reflected beam from the projected beam and to direct it onto a radiation-sensitive detector 22, on which this beam forms a detector spot 23, a beam splitter is arranged in the radiation path. This beam splitter may consist of a splitting mirror but is preferably constituted by a polarization-sensitive splitting prism 17 in combination with a $\lambda/4$ plate 18, in which $\lambda$ is the wavelength of the scanning beam. A $\lambda/4$ plate 19 may be arranged between the radiation source 5 and the splitting prism 17 so as to adapt the state of polarization of the beam emitted by the source to the direction of polarization of the splitting prism.

During scanning, for example, for reading a record carrier, the scanning spot 13 and the record carrier are moved with respect to each other in the track direction so that a track is scanned completely. By moving the scanning spot and the record carrier with respect to each other in the radial direction, perpendicular to the track direction, the complete record carrier can be scanned. The detector 22 converts the incident beam into one or more electric signals. One of these signals is an information signal 24 which represents the information read from the record carrier. Another signal is a focus error signal 25 which is representative of a possible deviation between the axial position of the focus 13 and that of the information layer 3. The signal 25 is used in a focus servosystem for correcting the position of the focus with respect to the information layer, for example, by moving the objective lens 10 in the axial direction.

FIG. 2 shows the same scanning device as FIG. 1, but now in combination with a second type of record carrier 31, for example, of the type known as audio CD. This record carrier comprises a transparent layer 32, an information layer 33 and a protective coating 34 and thus has the same construction as the record carrier 1. However, the transparent layer 32 of the record carrier 31 has a larger thickness, for example, 1.2 mm, than the thickness of the record carrier 1, while the record carrier 31 has a smaller information density than the record carrier 1. The scanning device is designed for optimally reading the record carrier 1, and the objective lens 10 is designed in such a way that it forms a best focus on the information layer 3, i.e. a focus with a Strehl ratio which is close to 1. For this reason, the objective lens is corrected for the spherical aberration which occurs when an uncorrected, converging scanning beam 12 passes the transparent layer 2, i.e. as in the situation depicted in FIG. 1. The wave front of the corrected converging beam 12 is, in principle, spherical near the focus 13. For the situation depicted in FIG. 2, it holds that the information layer 33 of the record carrier 31 can be satisfactorily scanned by the beam 12 if the axial position of this layer is not the position of the best focus but the position of the paraxial focus of the converging beam 12. If the information layer 33 is present at a different axial position than that of the paraxial focus, the quality of the focus, or scanning spot, 35 deteriorates rapidly, which results in a reduced quality of the signals supplied by the detector. In a small area around the position of the paraxial focus, the wave front of the converging beam exhibiting aberration is substantially spherical in a central part of the aperture. The scanning spot has a small central area with a high intensity, coming from radiation from the central part of the aperture and, around the central area, a large area with a low intensity, coming from radiation outside the central part of the aperture. The quality of the central part of the scanning spot 35 is sufficient to scan the information layer 33, and it can be ensured that the outer part is not used for scanning. When scanning with the paraxial focus, the central part of the wave front is relatively flat, but the outer part of this wave front has a strong deviation. Due to this deviation, the direction of the border rays changes so that it becomes possible to prevent these border rays from contributing to the detector signals. By choosing the radiation-sensitive surface of the detector to be so small that only radiation from the central part of the pupil can reach the detector when scanning the record carrier 31, the disturbing effect of the uncompensated spherical aberration on the detector signals can be substantially eliminated.

Figure 3:
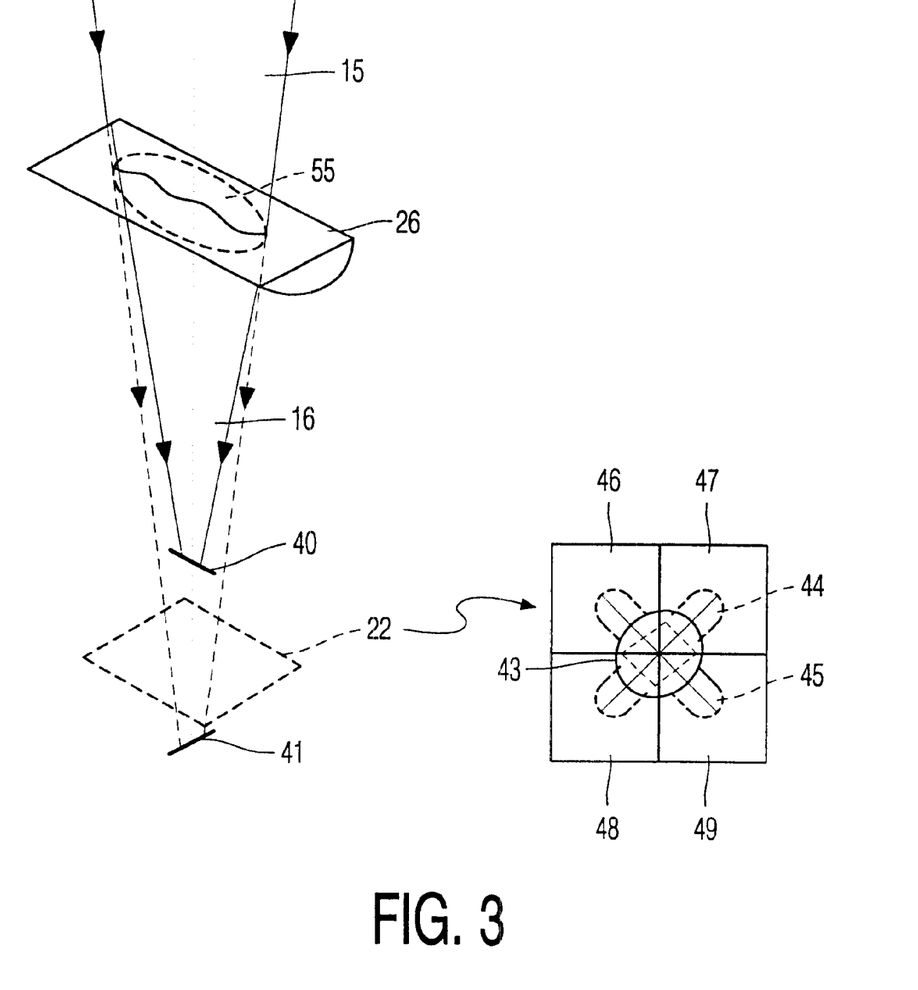
FIG. 3 shows the principle of the astigmatic focus error signal generation.

For generating a focus error signal when scanning an optical record carrier, the reflected scanning beam may be rendered astigmatic and a quadrant detector may be used as detector, as described, inter alia, in the article "Optics of Reflective Videodisc Players" in SMPTE Journal, vol. 85, November 1976, pp. 881–886. The beam may be rendered astigmatic by arranging, for example, a cylindrical lens 26 between the splitting prism 17 and the detector 22, as is shown in FIGS. 1 and 2. This lens, whose cylindrical axis is, for example, parallel to the X axis, ensures that the reflected scanning beam 16 in FIG. 1, or the central part 37 of the reflected scanning beam 36 in FIG. 2, has two astigmatic focal lines 40 and 41, as is shown in FIG. 3, instead of a single focus. This Figure shows the part of the radiation path from the cylindrical lens 26. These focal lines are perpendicular to each other and are offset with respect to each other in the axial direction. The broken line 42 indicates the axial position of the radiation-sensitive surface of the detector 22, which detector is shown in a plan view in the right-hand part of FIG. 3. If, as shown in FIG. 3, the cylindrical lens is a positive lens, the focal line 40 is closer to this lens than the focal line 41. The scanning device is designed in such a way that the axial distance between the detection plane 42 and the focal line 41 is as large as the distance to the focal line 40 when the scanning beam 12 is focused on the information layer. As is shown in the right-hand part of FIG. 3, the radiation spot 43 formed on the detector 22 and being an image of the scanning spot 13 in FIG. 1, or 35 in FIG. 2, is then round. If the focus 13 of the scanning beam moves downwards with respect to the plane of the information layer in FIG. 1, the focal lines in FIG. 3 move upwards with respect to the detection plane 42 so that this plane is closer to the focal line 41 than to the focal line 40. Then, the radiation spot 44 formed in this plane has the shape of an ellipse whose major axis is parallel to the focal line 41. When the focus of the scanning beam moves upwards with respect to the information layer in FIG. 1, the focal lines in FIG. 3 move upwards with respect to the detection plane 42. The focal line 40 is then located closer to the detection plane 42 than the focal line 41 and the radiation spot 45 has the shape of an ellipse whose major axis is parallel to the focal line 40. The size and direction of defocusing of the scanning beam with respect to the information layer thus defines the shape of the radiation spot formed on the detector. This change of shape can be detected because the detection comprises four detector elements 46, 47, 48 and 49 situated in different quadrants. If the signals of these detection elements are represented by $S_{46}$, $S_{47}$, $S_{48}$ and $S_{49}$, the focus error signal $S_f$ is defined by $$S_f = (S_{46} + S_{49}) - (S_{47} + S_{48})$$

The information signal $S_i$ is defined by:

$$S_i = S_{46} + S_{47} + S_{48} + S_{49}$$

Figure 4:
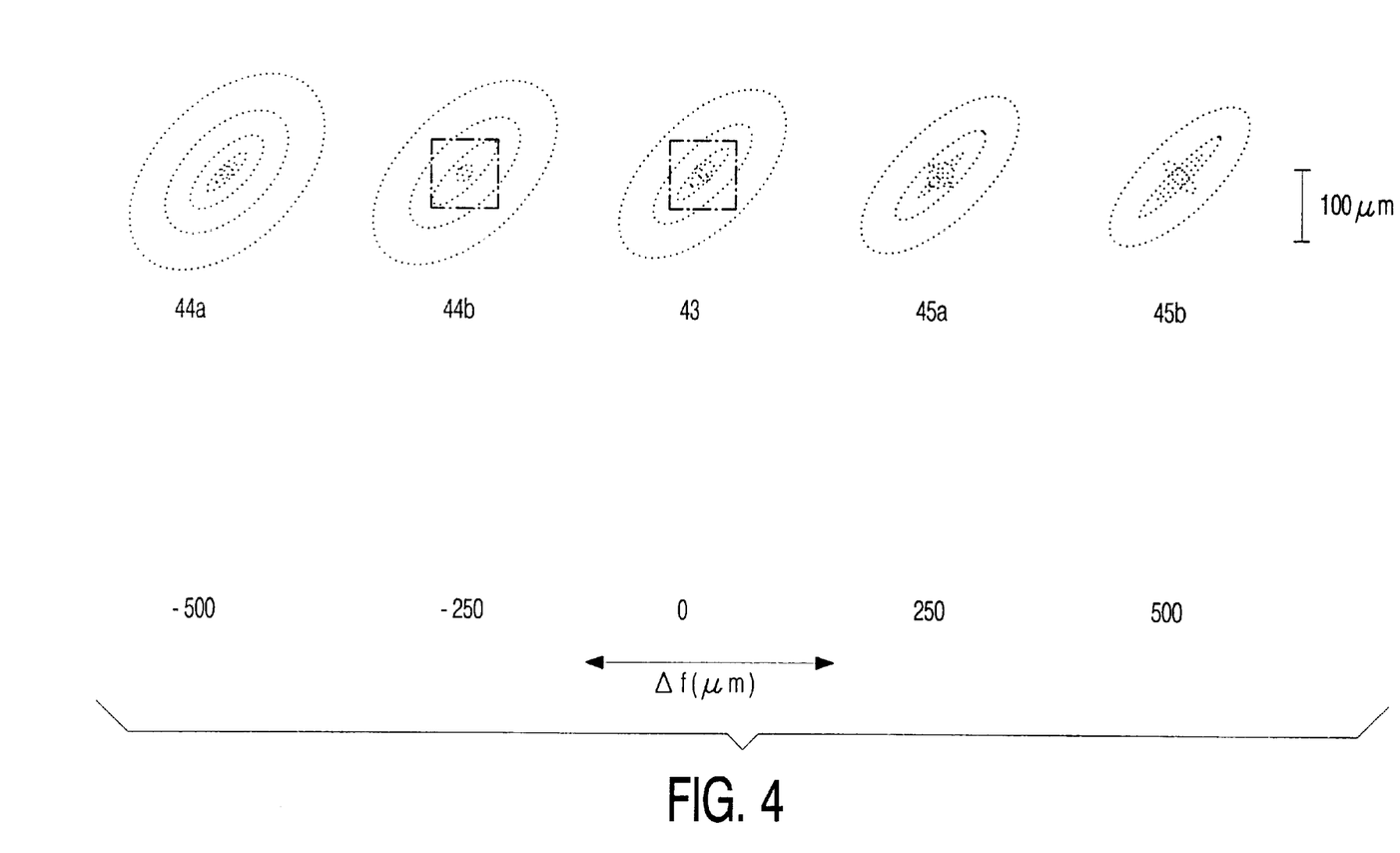
FIG. 4 shows diagrams of the radiation spot formed on the detector of this scanning device when scanning a second type of record carrier and at different focus settings.

It has been found that a satisfactory information signal of the two types of record carriers can be obtained with the scanning device of FIGS. 1, 2 and 3, but that, when scanning the second type of record carrier, the focus error signal has such a strong aberration that it is not very well usable. This is caused by the fact that a part of the rays outside the central part of the pupil, which central part covers, for example, 55% of the pupil, is still incident on the quadrant detector 22. This results in a radiation spot diagram as shown in FIG. 4. This Figure shows different detector spot diagrams 43', 44a', 44b', 45a' and 45b' for different extents of defocusing Δf. The diagrams of FIG. 4 and subsequent Figures are the result of calculating, for a large number of rays of the scanning beam, the positions where these rays are incident on the detection plane 42. These diagrams thus show the intensity distribution across the detection plane. As is apparent from FIG. 4, there is relatively little intensity concentrated in the central part, and this central part does not have a pronounced round shape for Δf=0, or an elliptical shape with a major axis at +45°, or −45°, with the horizontal axis of FIG. 4. In fact, the central part of the radiation spot on the detector does not have a sufficient change of shape from a left tilted ellipse via a circle to a right tilted ellipse at a change from Δf=−500 μm via Δf=0 to Δf=+500 μm. The Δf values shown in FIG. 4 are the values for the defocusing on the side of the detector 22, i.e. for defocusing the detection spot, which values are related to those of the detection spot 35 via the square value of the magnification M of the lens system 8, 9. The detector having a surface area of, for example, 100×100 μm$^2$ is shown by way of broken lines in FIG. 4.

Figure 5:
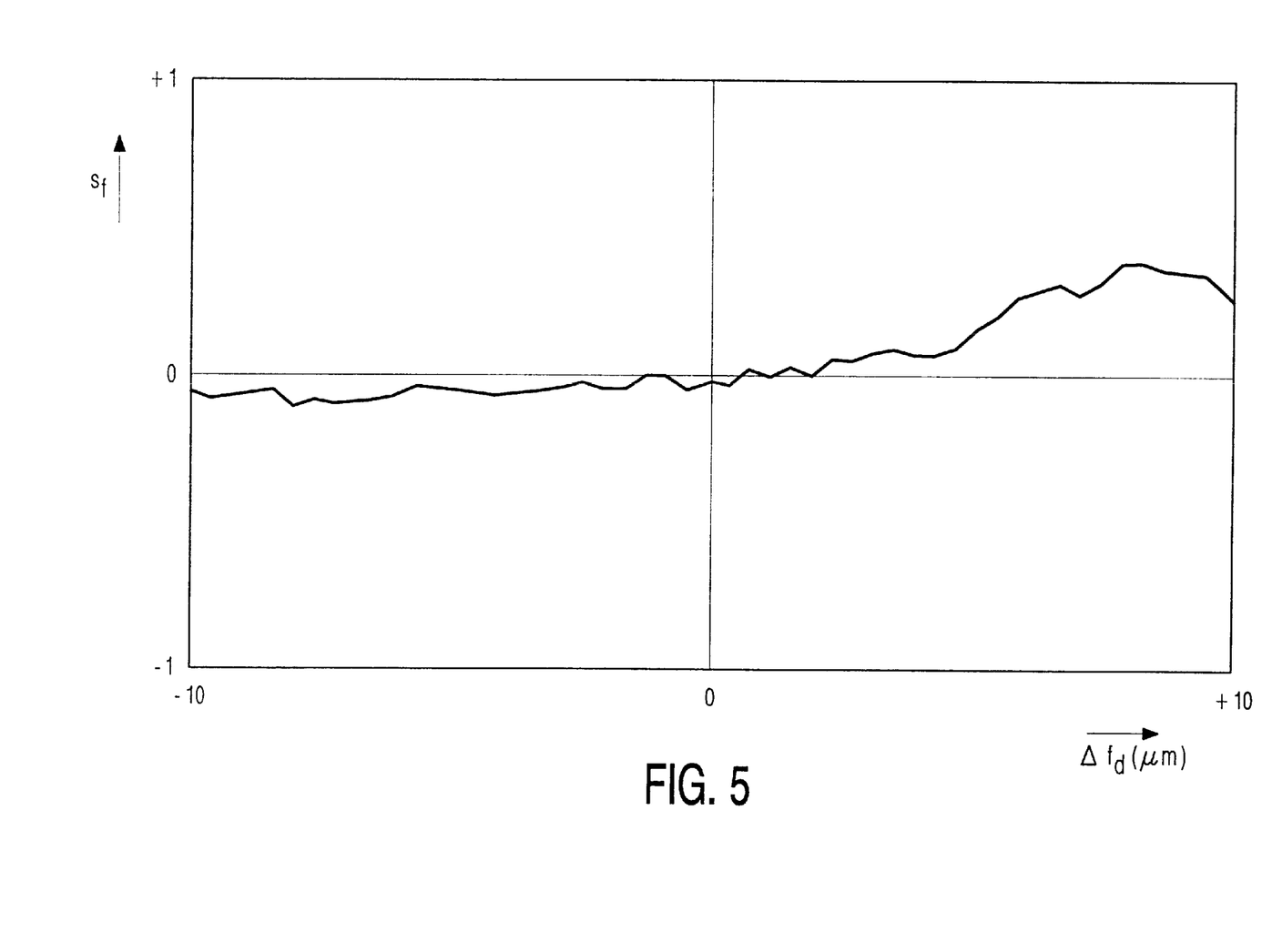
FIG. 5 shows the focus error signal generated in the known scanning device when scanning a second type of record carrier.

FIG. 5 shows the focus error signal $S_f$ which is generated in the scanning device in which no further measures are taken. In this Figure, the defocusing $\Delta f_d$ on the side of the record carrier, i.e. the axial distance between the focus 35 and the information layer 33, is plotted on the horizontal axis, and the focus error signal $S_f$ is plotted on the vertical axis. The curve does not show the desired steep slope around zero ($\Delta f_d$=0) and has a relatively flat and irregular variation with several zeros. It will be evident that this signal is not very well usable for correcting the focus of the scanning beam with respect to the record carrier 31.

According to the invention, the focus error signal can be considerably improved by providing an aspherical surface in the detection branch of the device, i.e. in the radiation path between the splitting prism 17 and the detector, which aspherical surface compensates the asphericity of the border rays of the reflected beam 36 incident on the quadrant detector 22. This surface only covers the central part of the pupil, i.e. 55% of the pupil in the above-mentioned example. By adding the aspherical surface, the beam incident on the radiation-sensitive surface of the detector will become considerably more purely astigmatic, as is apparent from a comparison between FIG. 4 and FIG. 6.

Figure 6:
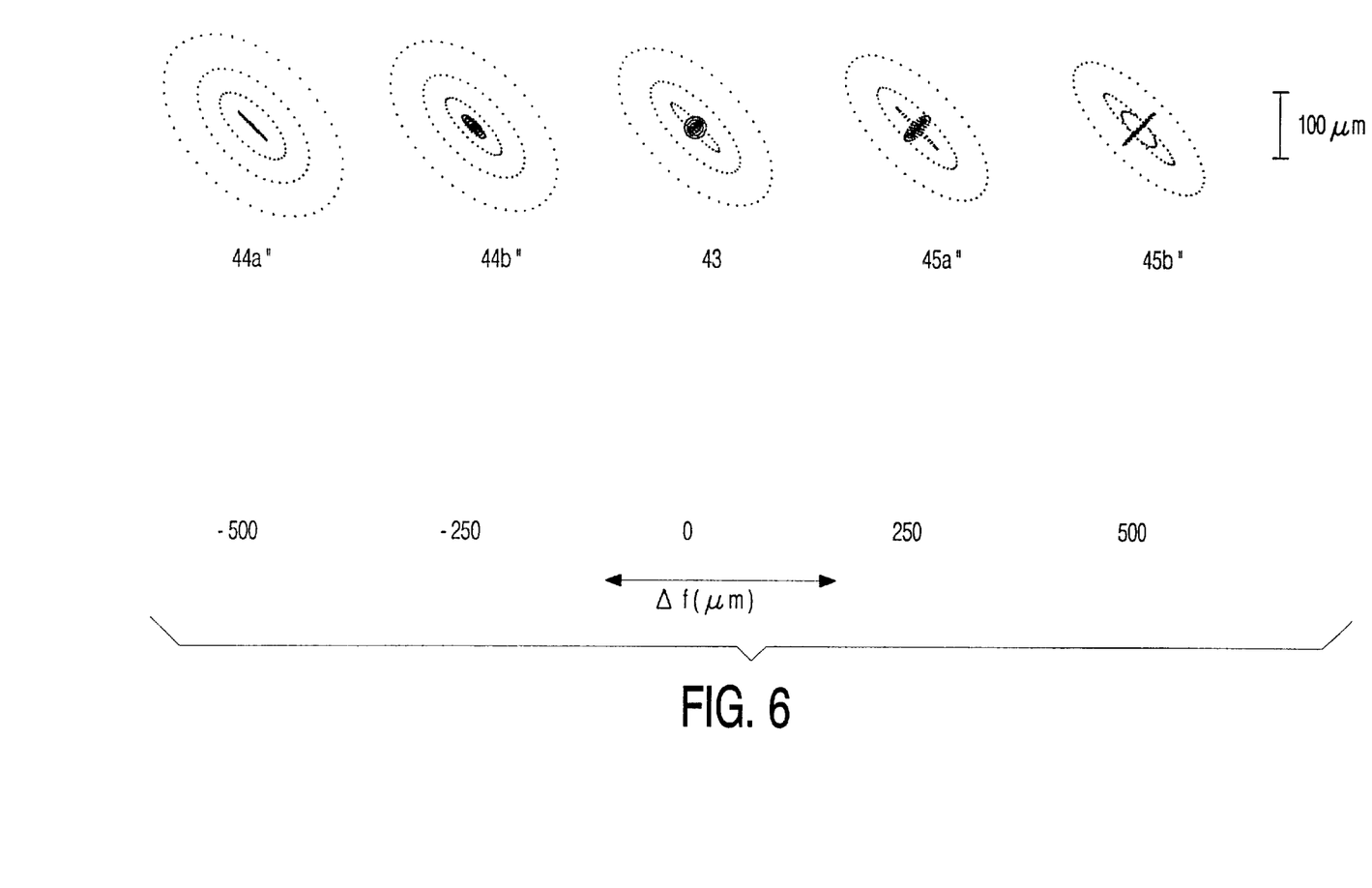
FIG. 6 shows diagrams of the radiation spot formed on the detector of the scanning device according to the invention when scanning a second type of record carrier and at different focus settings.

FIG. 6 shows the detector spot diagrams 43", 44a", 44b", 45a" and 45b" which apply to different defocusings Δf on the side of the detector if said aspherical surface is provided in the radiation path. Now, there is more radiation intensity in the central part of the detector plane, and this central part has a clear shape which, as a function of the defocusing $\Delta_f$, shows a clear variation, namely from a narrow strip (44a") inclined to the left to, consecutively, an ellipse (44b") inclined to the left, a circle (43"), an ellipse (45a") inclined to the right and a narrow strip (45b") inclined to the right.

Figure 7:
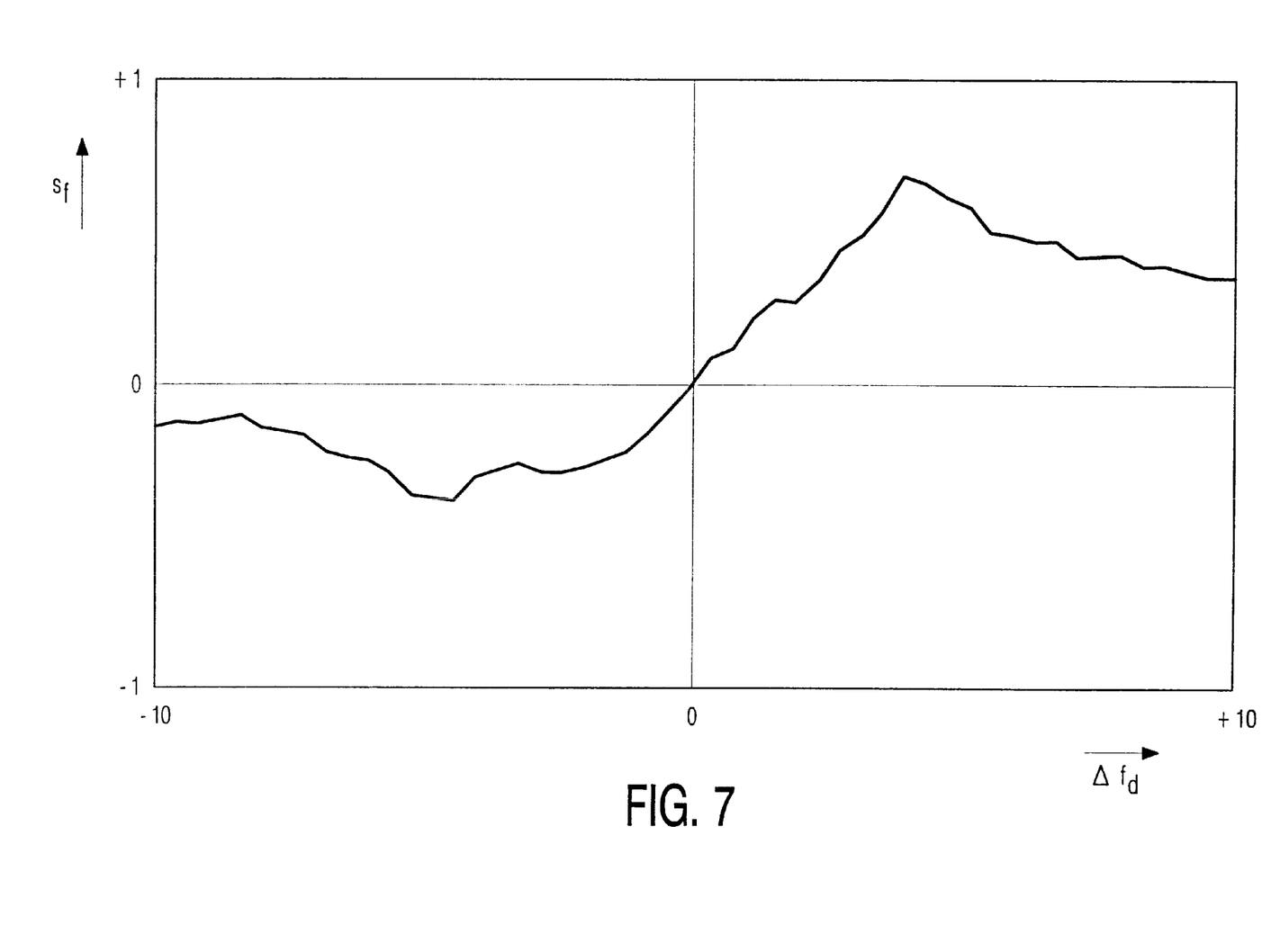
FIG. 7 shows the focus error signal generated in the scanning device according to the invention when scanning a second type of record carrier.

The variation of the focus error signal $S_f$ associated with the detector spot diagrams of FIG. 6 as a function of the defocusing $\Delta f_d$ on the side of the record carrier 31 is shown in FIG. 7. This signal has only one zero and a sufficiently steep slope around this zero and is consequently very suitable for correcting the focus 35 with respect to the information layer 33.

Figure 8:
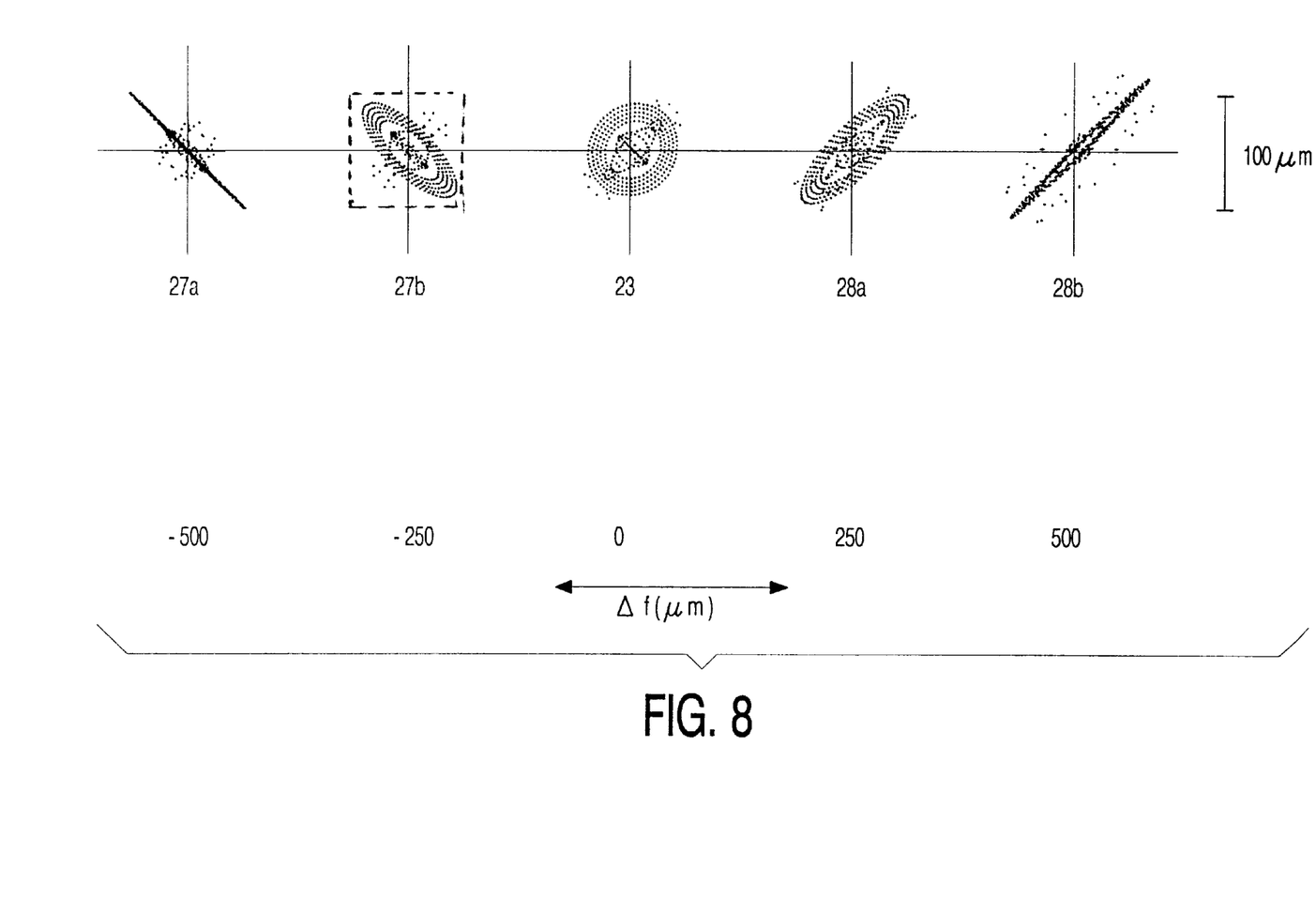
FIG. 8 shows diagrams of the radiation spot formed on the detector of the scanning device according to the invention when scanning a first type of record carrier and at different focus settings.
Figure 9:
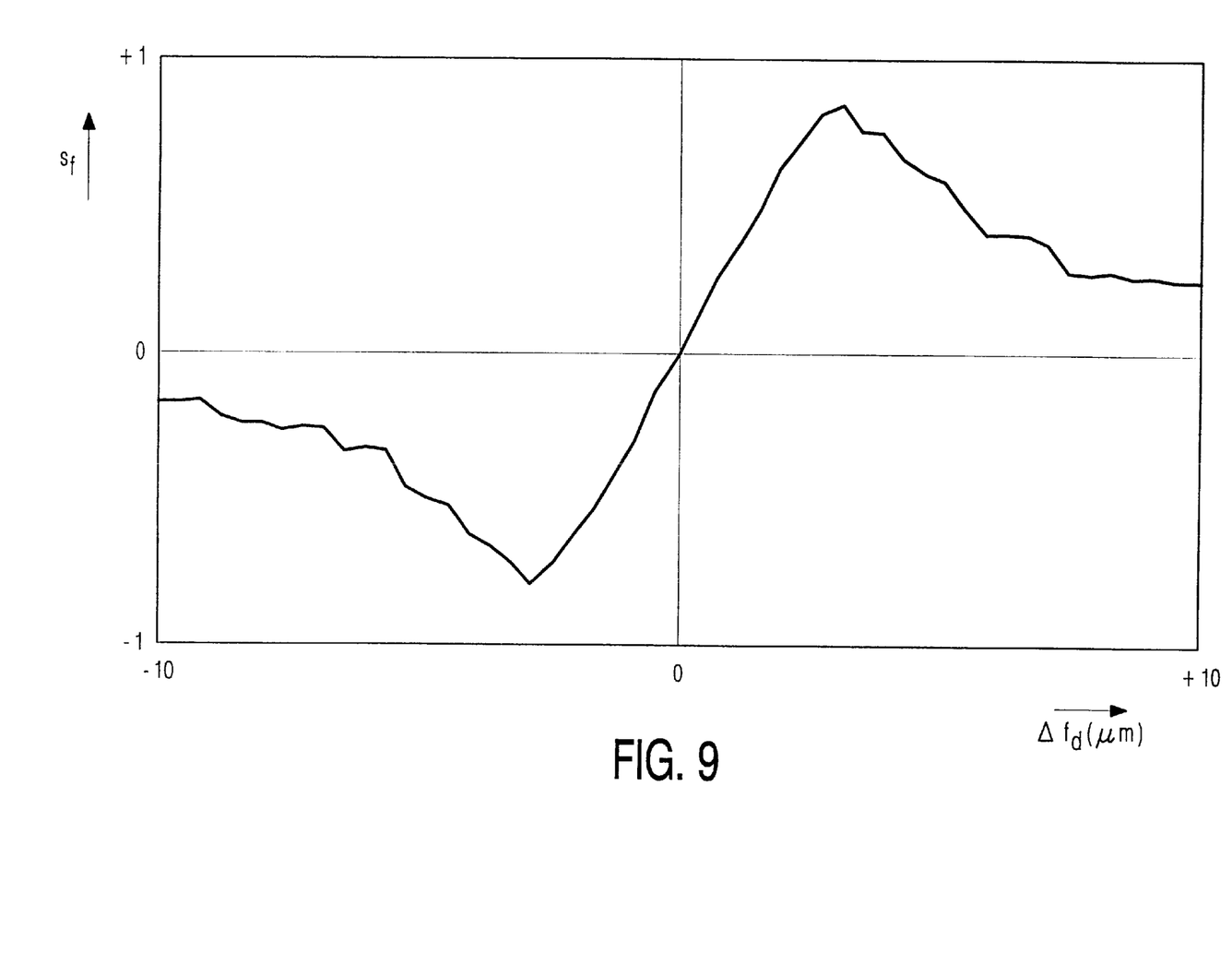
FIG. 9 shows the focus error signal generated in the scanning device according to the invention when scanning a first type of record carrier.

Since the central aspherical surface is present in the radiation path, also when reading a record carrier of the first type, whose transparent layer has a thickness of, for example, 0.6 mm instead of, for example, 1.2 mm, this surface will cause a spherical aberration in the detector spot 23. However, as is shown by the radiation diagrams for this detector spot at different defocusings Δf in FIG. 8, the total size of the detector spot 23, for Δf=0, remains within the size of the detector 22, and this spot has the desired variation regarding shape upon a change of the focus. Consequently, the quality of the focus error signal is maintained when scanning the first type of record carrier, as is shown in FIG. 9. This Figure shows the focus error signal $S_f$ as a function of the defocusing $\Delta f_d$ on the side of the record carrier, when scanning a record carrier of the first type.

The central aspherical surface may be the surface of a separate element which is provided in the radiation path specially for the purpose of the invention. Due to costs and assembly aspects, which are very important for a consumer apparatus, it is preferable to render a central part of a surface of an optical element which is already present, such as the lower side of the splitting prism 17 which is not traversed by the projected beam 6, or a surface of the cylindrical lens 26 aspherical.

Figure 10:
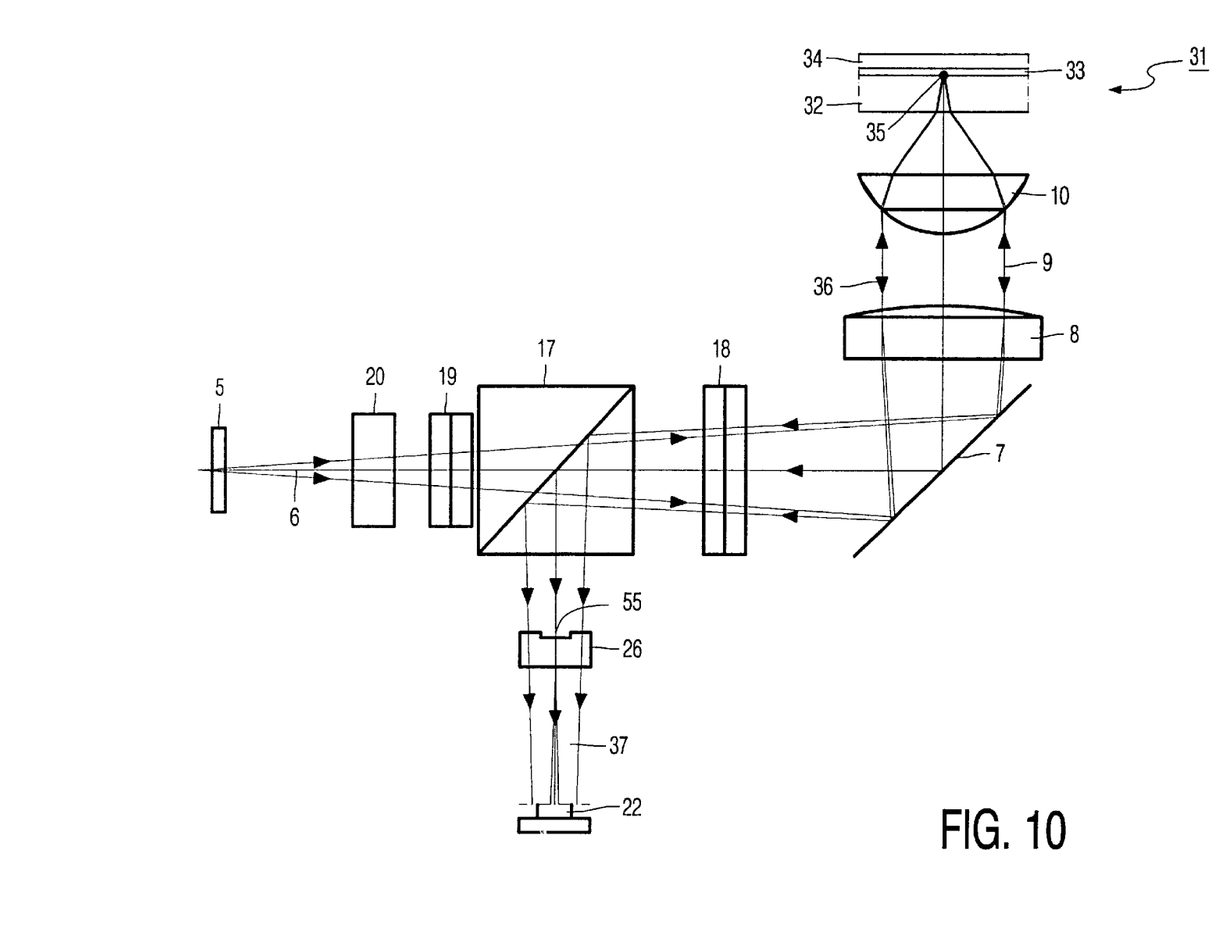
FIG. 10 shows an embodiment of a scanning device according to the invention.

FIG. 10 shows an embodiment of the scanning device in which a central part 55 of the upper surface of the cylindrical lens has been rendered aspherical. As is more clearly shown in FIG. 3, the aspherical surface may be present on the flat side of the cylindrical lens. This surface covers, for example, 55% of the pupil diameter and is, for example, equal to the cross-section, at the area of this surface, of the beam 15, the reflected beam if a record carrier of the first type is scanned. The aspherical surface then covers 55% of the cross-section, at the area of this surface, of the beam 36 which is reflected if a record carrier of the second type is read.

Figure 11:
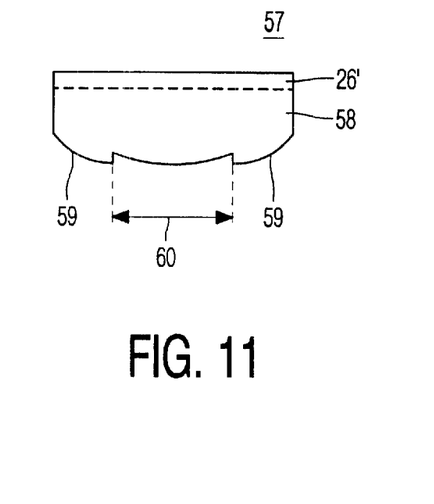
FIG. 11 shows an integrated optical element with an aspherical profile for use in this device.

In practice, the detection branch of the device preferably includes an extra, converging, lens so as to concentrate the radiation reflected by the record carrier on the detector. Such a lens is preferably integrated with the cylindrical lens. In that case, the central aspherical surface may be formed by a part of a surface of the extra lens. FIG. 11 shows such an integrated lens 57. The cylindrical lens portion thereof is denoted by the reference numeral 26' and the spherical lens portion is denoted by the reference numeral 58. The curved surface of the element 58 has a peripheral portion 59, which is spherical, and a central portion 60, which is aspherical.

Figure 12:
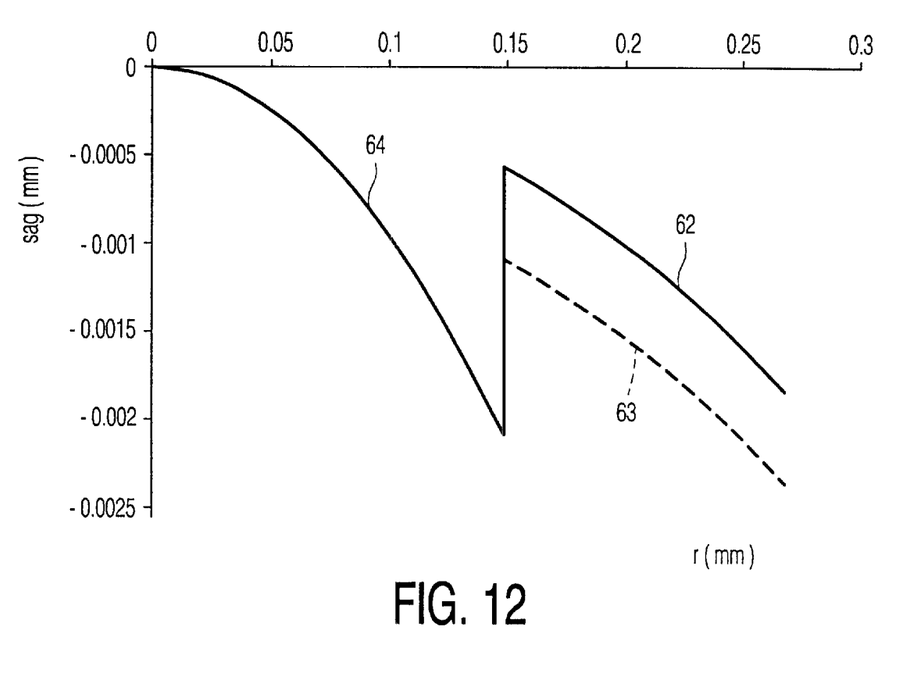
FIG. 12 shows an example of an aspherical profile according to the invention.

An example of the surface profile of the lens element 58 is shown on a larger scale in FIG. 12. The radial distance r of the points of the surface to the optical axis OO' is plotted on the horizontal axis, and the height sag of these points, i.e. the position along the optical axis, is plotted on the vertical axis. The curve 62 which represents the peripheral portion, has a constant radius of curvature, while the radius of curvature of the curve 64, which represents the central portion, varies with the radial distance r.

Dependent on the chosen magnification with which the scanning spot on the information layer is imaged in the detector spot, the astigmatic detector spot formed when scanning the first type of record carrier and the astigmatic detector spot formed when scanning a second type of record carrier can be detected with the same detector size. By displacing, along the optical axis, the spherical surface part with respect to the aspherical surface part, which is indicated by means of the curves 62 and 63 in FIG. 12, it can be ensured that the optimal focus upon reading the second record carrier coincides with the optimal focus upon reading the first record carrier.

What is claimed is:

1. An optical scanning device for scanning a first type of record carrier provided with a first information layer and a first transparent layer having a first thickness, and for scanning a second type of record carrier provided with a second information layer and a second transparent layer having a second thickness which differs from the first thickness, said scanning device comprising:

a radiation source for supplying a scanning beam;

an objective system for converging the scanning beam on the first information layer and on the second in formation layer; and a radiation-sensitive detector for converting the modulated scanning beam coming from the first and second information layers into electric signals, a radiation-sensitive surface of the detector having such an effective size that it receives radiation from a substantially complete scanning beam coming from the first type of record carrier and from substantially only the central part of a scanning beam coming from the second type of record carrier, characterized in that an aspherical surface having a size which is substantially equal to the cross-section of said central part is present in the path of only the modulated scanning beam between the objective system and the radiation-sensitive detector.

2. The optical scanning device of claim 1, wherein an astigmatic element is arranged in the path of only the modulated scanning beam, and wherein the aspherical surface is constituted by a surface of the astigmatic element.

3. The optical scanning device of claim 2, wherein the astigmatic element is constituted by a cylindrical lens such that the cylindrical lens is integrated with a rotationally symmetric lens, and wherein the aspherical surface is constituted by a surface of the rotationally symmetric lens.

4. The optical scanning device of claim 2, wherein the astigmatic element is constituted by a cylindrical lens.

5. The optical scanning device of claim 2, wherein the aspherical surface is positioned such that the modulated scanning beam is incident upon the aspherical surface before the modulated scanning beam propagates into the interior of the astigmatic element.

6. The optical scanning device of claim 1, further comprising a beam splitter for directing the modulated scanning beam onto the radiation-sensitive detector, wherein the beam splitter consists of a polarization-sensitive splitting prism in combination with a $\lambda/4$ plate.

* * * * *